United States Patent
Fu et al.

(10) Patent No.: US 12,433,841 B2
(45) Date of Patent: Oct. 7, 2025

(54) INJECTABLE CONTROLLED-RELEASE FORMULATIONS OF PROGESTOGEN DRUGS

(71) Applicant: FORDOZ Pharma Corp., East Windsor, NJ (US)

(72) Inventors: Zengli Fu, Kendall Park, NJ (US); Sydney Ugwu, North Brunswick, NJ (US); James He, Green Brook, NJ (US)

(73) Assignee: FORDOZ Pharma Corp., East Windsor, NJ (US)

( * ) Notice: Subject to any disclaimer, the term of this patent is extended or adjusted under 35 U.S.C. 154(b) by 437 days.

(21) Appl. No.: 17/791,977

(22) PCT Filed: Feb. 15, 2021

(86) PCT No.: PCT/US2021/018093
§ 371 (c)(1),
(2) Date: Jul. 11, 2022

(87) PCT Pub. No.: WO2021/173373
PCT Pub. Date: Sep. 2, 2021

(65) Prior Publication Data
US 2023/0057790 A1 Feb. 23, 2023

Related U.S. Application Data

(60) Provisional application No. 62/981,748, filed on Feb. 26, 2020.

(51) Int. Cl.
*A61K 9/16* (2006.01)
*A61K 9/00* (2006.01)
*A61K 31/57* (2006.01)

(52) U.S. Cl.
CPC .......... *A61K 9/1647* (2013.01); *A61K 9/0019* (2013.01); *A61K 31/57* (2013.01)

(58) Field of Classification Search
CPC .... A61K 9/1647; A61K 9/0019; A61K 31/57; A61P 15/02; A61P 15/08; A61P 15/18
See application file for complete search history.

(56) References Cited

U.S. PATENT DOCUMENTS 9,532,995 B2    1/2017   Govindarajan
2004/0224030 A1*   11/2004   Shastri ................ A61K 9/5031
                                                                                           424/490

FOREIGN PATENT DOCUMENTS

EP          2305267       4/2011
WO     2014143839      9/2014

OTHER PUBLICATIONS

Pu et al, "In Vitro-In Vivo Relationship of Amorphous Insoluble API (Progesterone) in PLGA Microspheres", Pharm Res, 2017, vol. 34, pp. 2787-2797 (Year: 2017).*
Sun et al, "Synchronic release of two hormonal contraceptives for about one month from the PLGA microspheres: In vitro and in vivo studies", Jour. Contr. Rel., 2008, vol. 129, issue 3, pp. 192-199 (Year: 2008).*

(Continued)

*Primary Examiner* — Marianne C Seidel
*Assistant Examiner* — Joshua A Atkinson
(74) *Attorney, Agent, or Firm* — Florek & Endres PLLC

(57) ABSTRACT

The present invention relates to injectable microspheres and formulations comprising the microspheres for controlled release of progestogen hormones.

13 Claims, 4 Drawing Sheets

(56) References Cited

OTHER PUBLICATIONS

Guo et al, "Injectable Sustained-Release Depots of PLGA Microspheres for Insoluble Drugs Prepared by hot-Melt Extrusion", Pharm Res, 2017, vol. 34, pp. 2211-2222 (Year: 2017).*
Turino et al, "In vitro evaluation of suspoemulsions for in situ-forming polymeric microspheres and controlled release of progesterone", Jour Microencapsulation, 2015, vol. 32, issue 6, pp. 538-546 (Year: 2015).*
PCT International Search Report for PCT/US2021/018093, Jun. 3, 2021.
PCT International Written Opinion for PCT/US2021/018093, Apr. 30, 2021.
Wu XS., Synthesis, Characterization, Biodegradation, and Drug Delivery Application of Biodegradable Lactic/Glycolic Acid Polymers: Part III. Drug Delivery Application., Artificial Cells, Blood Substitutes, and Biotechnology. Jan. 1, 2004;32(4):575-91.
Xu, et al. "Polymer Degradation and Drug Delivery in PLGA-Based Drug-Polymer Applications: A Review of Experiments and Theories," Journal of Biomedical Materials Research part B: Applied Bbiomaterials 105.6 Aug. 2017: 1692-1716.
Zhang et al., "Design of Controlled Release PLGA Microspheres for Hydrophobic Fenretinide," Molecular Pharmaceutics. Aug. 1, 2016;13(8):2622-30.
Baskaran et al., "Poly (Lactic-Co-Glycolic Acid) Microspheres Containing a Recombinant Parathyroid Hormone (1-34) for Sustained Release in a Rat Model," Indian Journal of Pharmaceutical Sciences. Sep. 30, 2018;80(5):837-43.
Shen et al., "In Vitro-In Vivo Correlation of Parenteral Risperidone Polymeric Microspheres," Journal of Controlled Release. Nov. 2015. 28;218:2-12.
Sun et al., "Butyl Stearate Prolongs the Drug Release Period of Isoperidone Loaded Poly(Lactic Co Glycolic Acid) Microspheres: In Vitro and In Vivo Investigation," Molecular Medicine Reports. Mar. 1, 2019;19(3):1595-602.

* cited by examiner

INJECTABLE CONTROLLED-RELEASE FORMULATIONS OF PROGESTOGEN DRUGS

This application is the U.S. National Stage filing of International Patent Application Number PCT/US2021/018093, filed on Feb. 15, 2021 which claims the benefits of U.S. Provisional Patent Application Ser. No. 62/981,748 filed Feb. 26, 2020, the contents of which are incorporated herein by reference.

FIELD OF THE INVENTION

The present invention relates to injectable microspheres and formulations containing the microspheres for controlled release of progestogen hormones. More particularly, the invention relates to microspheres and formulations thereof that exhibit a cumulatively linear release profile, without initial burst or lag phase, and within a controlled time period. The inventions also related to methods for making the microspheres and formulations comprising the microspheres and methods of using the microspheres and formulations comprising the microspheres.

BACKGROUND OF THE INVENTION

Progestogen hormones play a central role in the reproductive events associated with pregnancy establishment and maintenance. In medical practice, progestogens are used in hormonal birth control, menopausal hormone therapy, treatment of gynecological conditions, support of fertility and pregnancy and for other indications. Examples of progestogens include natural or bio-identical progesterone as well as progestins (synthetic progestogens) such as medroxyprogesterone acetate, hydroxyprogesterone caproate, northindrone, and norethisterone.

Progesterone is widely used in women to support pregnancy and fertility and to treat gynecological disorders. The drug is well-tolerated and often produces few or no side effects. Progesterone can be taken by mouth, by intravaginal administration and by injection into muscle or fat, among other routes. Oral administration of progesterone has been associated with slow gastrointestinal absorption and high hepatic metabolism, which limits the plasma levels of the drug that can be achieved and drug efficacy. Intravaginal administration achieves an adequate and targeted drug delivery, but is associated with concerns such as incomplete drug absorption and discomfort.

The parenteral administration of progesterone has been used for a long time and is a preferred route because it is a more reliable way of achieving high serum levels of progesterone. Because of the hydrophobic nature of the progesterone molecule, the drug has a poor solubility in water but is readily soluble in oil. Therefore, oil solution formulations have been used for intramuscular administrations. For example, for the treatment of amenorrhea and abnormal uterine bleeding, progesterone-in-oil injection is given once daily for six to eight consecutive days. However, the injection of the oil formulation is usually associated with severe pain and the repeated injections may cause hypersensitivity reactions including local soreness, sterile abscess formation, severe inflammatory and allergic reactions due to local tissue disruption caused by the oil.

Long-acting sustained-release progesterone formulations are less irritating when administered intramuscularly and hence is desired and advantageous in reducing the dosing frequency and improving patient's compliance to therapy.

Microspheres employing poly(lactic-co-glycolic acid) copolymers (PLGA) have been successfully used for making long-acting drug delivery systems that can achieve sustained-release of drugs from weeks to months. Furthermore, the PLGA polymer has been proven to be an excellent encapsulation material because of its biocompatibility and biodegradability. For a review, see Xu, Y., et al., *J. Biomater., Res. Part B* 2017, 105B: 1692-1716. However, sustained-release formulations based on PLGA microspheres usually exhibit non-linear cumulative drug release profiles that have either a high initial release "burst phase" or a delayed release "lag phase" during which the release rate is almost zero. See, e.g., Zhang, Y., et al., *Mol. Pharm.*, Design of controlled release PLGA micro spheres for hydrophobic fenretinide, May 14, 2016 (web publication) (initial burst); Baskaran, R., et al., *Indian J. Pharm. Sci.*, 2018, 80(5), 837-843 (initial burst); Shen, J., et al., *J. Control Release*, 2015, 218, 2-12 (lag phase); and Sun, F., et al., *Mol. Med. Rep.*, 2019, 19, 1595-1602 (lag phase). The non-linear release profiles are not suitable for the progesterone therapies that require a daily intramuscular injection of drug from day 1 through days 6-8.

It is desirable to develop progestogen, preferably progesterone, loaded PLGA microspheres and formulations thereof that exhibit a linear cumulative release profile until about 70% or more of the progestogen is released from the microspheres or formulations containing the microspheres. It is also desirable that the linear cumulative release profile until about 70% or more of the progestogen is released occurs over a period of at least 6 days or longer. It is further desirable that the linear cumulative release profile until about 70% or more of the progestogen is released occurs without an initial burst or lag phase.

SUMMARY OF THE INVENTION

The present invention provides controlled-release microspheres and/or parenteral formulations comprising the controlled-release microspheres that meet the above desires.

Embodiments of the present invention comprise micro spheres that are suitable for parenteral administration. The microspheres comprise a progestogen drug that is encapsulated in a biodegradable polymer composition, preferably a biodegradable polymer composition comprising a PLGA polymer. The microspheres and/or the parenteral formulations comprising the microspheres have a linear cumulative drug release profile until about 70%, 75%, 80%, 85%, 90%, 95% or more of the progestogen is released from the microspheres or formulations containing the microspheres.

In certain aspects of the present invention, the microspheres and/or the parenteral formulations comprising the microspheres have a linear cumulative drug release profile that does not have an initial burst or a lag phase.

In further aspects of the present invention, the microspheres and/or the parenteral formulations comprising the microspheres have a linear cumulative drug release profile until about 70% or more of the progestogen is released, does not have an initial burst or a lag phase and the time until at least 70% or more of the progestogen is released is at least 6 days or more.

One embodiment of the invention is an injectable sustained-release formulation, preferably for subcutaneous or intramuscular administration, comprising: (a) a plurality of microspheres wherein the microspheres comprise a progestogen drug encapsulated by a PLGA biodegradable polymer and the microspheres exhibit an in vitro sustained release profile that is a linear cumulative release profile until at least about 70%, 75%, 80%, 85%, 90%, 95% or more of the progestogen is released within a controlled time period, and without an initial burst or lag phase; and (b) an injectable pharmaceutically acceptable carrier. In certain aspects of this embodiment, the controlled time period for the sustained release of the progestogen from the microspheres is at least 6 days or more. In certain aspects of this embedment the injectable pharmaceutically acceptable carrier comprises water and optionally one or more pharmaceutically acceptable excipients such as a surface active wetting agent, a viscosity enhancing agent, a tonicity agent, a pH adjusting, a buffering agent or a combination thereof. In certain aspects of this embodiment, the injectable sustained-release formulation may be packaged in a unit dose system, i.e. a syringe or vial, or a multiple dose system such a multiple dose vial.

The PLGA polymers used in the present invention are poly(lactic-co-glycolic acid) copolymers having molar ratios of lactide to glycolide between 90:10 and 40:60. The molecular weights of the polymers are in the range between 4 kD and 120 kD, preferably about 5 kD to about 75 kD, and the polymer chain end groups are carboxyl-terminated or ester-terminated.

The drug-loaded microspheres used in the present invention have a mean diameter of between about 20 µm and about 150 µm and the progestogen drug comprises between about 10% and about 50% by weight of the microspheres.

In some embodiments, the progestogen drug is progesterone, and the progesterone comprises between 20% and 50% by weight of the microspheres, preferably between 35% and 45% by weight of the microspheres, wherein the release of progesterone has a linear cumulative release profile until at least 70%, 80%, 85%, 90%, 95% or more of accumulated release and without an initial burst or lag phase, and the total time of the linear-cumulative release is in the range of about 6 to 14 days, preferably about 6 to about 10 days and more preferably about 6 to about 8 days.

Another aspect of the invention is directed to a method of making an injectable sustained-release formulation as described above, comprising the steps of preparing drug-loaded microspheres by an oil-in-water (O/W) emulsification process, comprising: 1) making an organic dispersed phase comprising a PLGA copolymer, an organic solvent or a mixture of organic solvents, and a progestogen drug substance; 2) mixing the organic dispersed phase with an aqueous continuous phase comprising water and a stabilizing agent such as polyvinyl alcohol ("PVA") to form an O/W emulsion; 3) removing the organic solvent or mixture or organic solvents from the O/W emulsion by extraction and/or evaporation to form solid PLGA microspheres; and 4) drying the drug-loaded microspheres. In certain embodiments of this aspect of the invention, the organic solvent or mixture of organic solvents is selected from the group consisting of dichloromethane, ethyl acetate, acetone, benzyl alcohol, methanol, ethanol, isopropyl alcohol, 1-butanol, iso-butyl alcohol, 1-pentanol, isopentyl alcohol, 1-hexanol and combinations thereof.

Another aspect of the invention is directed to a diluent solution used for suspending the microspheres. The diluent solution comprises water, preferably, water for injection and one or more pharmaceutically acceptable excipients such as a surface active wetting agent, a viscosity enhancing agent, a tonicity agent, pH buffering agents or combinations thereof.

A further aspect of the invention is directed to a method of treating gynecological disorders or providing treatment to prevent or to support pregnancy and fertility in women, comprising locally injecting to a subject a therapeutically effective amount of an injectable sustained-release formulation of this invention comprising the progestogen loaded microspheres suspended in a diluent solution.

DETAILED DESCRIPTION

Figure 1:
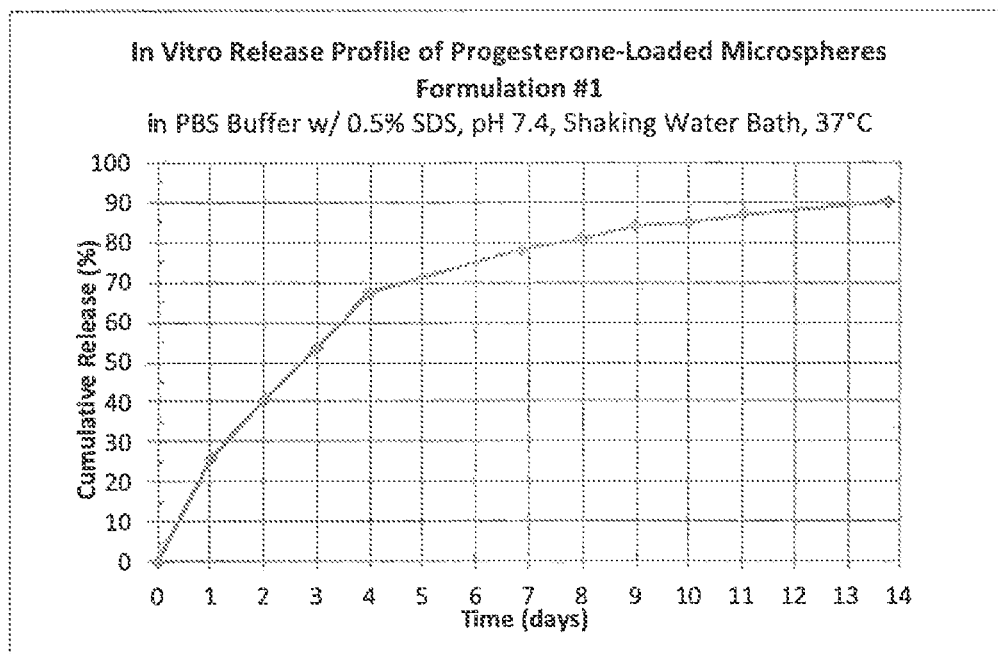
FIG. 1 shows the in vitro release profile of progesterone Formulation-1 described in Example 1.

Before the present invention is further described, it is to be understood that this invention is not limited to the particular embodiments described. It is also to be understood that the terminology used herein is for the purpose of describing particular embodiments only, and is not intended to be limiting.

It should be noted that as used herein, the singular forms "a," "an," and "the" include plural referents unless the context clearly dictates otherwise.

The term "pharmaceutically acceptable" describes a material that is not biologically or otherwise undesirable, i.e. without causing an unacceptable level of undesirable biological effects or interacting in a deleterious manner.

The term "therapeutically effective amount" means an amount effective to deliver a therapeutically effective amount of an active agent needed to delay the onset of, inhibit the progression of, or halt altogether the particular disease, disorder or condition being treated, or to otherwise provide the desired effect on the subject to be treated. As one of ordinary skill in the art would understand, a therapeutically effective amount varies with the patient's age, condition, and gender, as well as the nature and extent of the disease, disorder or condition in the patient, and the dosage may be adjusted by the individual physician (or veterinarian).

The terms "treating" and "treatment" refer to reversing, alleviating, inhibiting, or slowing the progress of the disease, disorder, or condition to which such terms apply, or one or more symptoms of such disease, disorder, or condition.

The term "subject" or "patient" used herein refers to a human patient or a mammalian animal, such as cat, dog, cow, horse, monkey, or the like.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

The term "about" generally refers to plus or minus 10% of the indicated number. For example, "about 10%" may indicate a range of 9% to 11%, and "about 20" may mean from 18 to 22. Other meanings of "about" may be apparent from the context, such as rounding off, so, for example "about 1" may also mean from 0.5 to 1.4. Similarly, "about 0.2" may encompass the value 0.22.

The terms "comprising," "having," "including," and "containing," or the like, are to be construed as open-ended terms (i.e., meaning "including, but not limited to,") unless otherwise noted.

As used herein, the term "microspheres" or the like, refers to small spherical or substantially spherical particles with diameters in the range of about 1 µm to about 1000 µm, for example, in some embodiments, about 10 µm to about 500 µm, in some embodiments, about 20 µm to about 150 µm, and in some embodiments, more specifically, from about 50 µm to about 100 µm, produced from natural and synthetic polymers, which can encapsulate a variety of drugs.

The term "sustained release," or the like, refers to a drug delivery system, such as microspheres, that releases the desired amount of drug molecule (or active pharmaceutical ingredient, API) for a defined or extended period of time ranging from days to months, for example, in some embodiments, release of about 80 to 90% of drug molecule in 5 to 15 days, and in some embodiments, release of about 30% of drug molecule in about 30 days, etc. The release of the drug molecule from the microspheres of the invention can occur in a continuous, discontinuous, linear or nonlinear manner, preferably continuous and linear manner.

The term "controlled release," or the like, refers to a delivery system, such as microspheres, that facilitates the release of a pre-determined amount of drug in a controlled-rate fashion. In the present invention, the terms "sustained release" and "controlled" are sometimes used interchangeably.

The term "initial burst", "burst phase release", or the like, refers to rapid release of drug from the microspheres or formulation containing the microspheres, typically due to the release of the drug loosely attached to the microsphere surface region rather than drug encapsulated inside the microspheres and/or non-encapsulated drug added to a formulation comprising the microspheres. Depending upon the particular use, an initial burst may be desirable to provide a loading dose of the drug or a dose that quickly produces a therapeutic plasma level of the drug.

The term "lag phase," "delayed release," or the like, refers to a period of time during which the release rate is almost zero. The lag phase is followed by a phase wherein the drug is release, preferably in a controlled or sustained release manner over the desired time period such as 1-14 days.

The term "substantially," as used herein, means "for the most part" or "essentially", as would be understood by a person of ordinary skill in the art.

As used herein, "substantially spherical" generally means a shape that is close to a perfect sphere. For example, "substantially spherical" can refer to microspheres wherein, when viewing any cross-section of the microspheres, the difference between the major diameter (or maximum diameter) and the minor diameter (or minimum diameter) is less than 20%, less than 15%, less than 10%, less than 5%, or less than 1% depending on the embodiment used. The term "substantially spherical" can also refer to a microsphere having a major diameter/minor diameter ratio of from about 1.0 to about 1.5, from about 1.0 to about 1.3, or from about 1.0 to about 1.1. The term "substantially linear" as used herein may refer to a release profile that is nearly linear, as judged by a person of ordinary skill in the art, although release profile may not be a perfect straight line. Alternatively, one method for determining if a release profile is substantially linear is to draw a straight line from the 0,0 point on a graph of the release profile to the 70%, 75%, 80%, 85%, 90%, 95% or 100% release point on the graph. If the values at the earlier release time points of the release profile are within about ±15, ±10, or ±5 percentage points of the straight line from the 0,0 point to the 70%, 75%, 80%, 85%, 90%, 95% or 100% release point on the graph, then the release is substantially linear. Another method is to calculate the linearity or linear correlation coefficient from the 0,0 time point to the 70%, 75%, 80%, 85%, 90%, 95% or 100% release point on the graph and if the linear correlation coefficient is equal to or greater than 0.75, 0.80, 0.85, 0.90 or 0.95, then the release profile is substantially linear.

Similarly, the term "substantially without an initial burst or a lag phase" used herein refers to a release profile where neither an initial burst nor a lag phase of the release of drug molecule is clearly visible to a person of ordinary skill in the art. In other words, a release profile "substantially without an initial burst or a lag phase" means that the line of release profile starts from the start time of testing the release of drug molecule ($T_0$) with a slope in consistence with the slope of bulk portion of the release profile line, without a distinct spike or a distinct lag time of zero (0) release rate near $T_0$.

As used herein the term progestogen include natural or bio-identical progesterone as well as progestins (synthetic progestogens). Specific examples of progestins may include without limitation, hydroxyprogesterone, megestrol acetate, dimethisterone, norgestrel, levonorgestrel, medroxyprogesterone acetate, desogestrel, norgestimate, ethynodiol diacetate, norethindrone, norethindrone acetate, and norethynodrel, including their active metabolites and derivatives. It should be understood that the term natural or bio-identical progesterone refers to the molecular structure as having a molecular structure similar to that found in nature. The natural progesterone drug used in the present invention may be obtained, i.e., extracted from natural sources or it may be obtained by known synthetic routes.

As used herein, "estrogen," "estrogenic steroid," and "estrogenic hormone" may be used interchangeably, and refer to any substance, natural or synthetic, that exerts a biological or pharmacological action primarily by binding to estrogen receptors. Examples include but are not limited to: 17-β-estradiol, 17-β-estradiol, estriol, estrone, and phytoestrogens. Examples of estrogens that may be used in the present invention include without limitation, conjugated equine estrogens, esterified estrogens, ethinyl estradiol, etc. Additional examples include but are not limited to: estradiol-3,17-diacetate, estradiol-3-acetate, estradiol-17-acetate, estradiol-3,17-divalerate, estradiol-3-valerate, estradiol-17-valerate. The estrogens may also be present as salts, (e.g., as sodium estrogen sulfate), isomers, or prodrugs.

Unless specifically defined, any terms used in this application take ordinary meanings as would be understood by those of skill in the art.

The present invention relates to controlled release microspheres that are suitable for parenteral administration. The microspheres comprise a progestogen drug that is encapsulated in a biodegradable polymer composition, preferably a biodegradable composition comprising, consisting essential of or consisting of a PLGA polymer. The microspheres and/or the parenteral formulations comprising the microspheres may have a linear cumulative drug release profile until at least about 70%, 75%, 80%, 85%, 90%, 95% or more of the progestogen is released from the microspheres or formulations containing the microspheres.

In certain aspects of the invention, the progestogen is progesterone, although one or more of the progestins described above may also be used to prepare the microspheres of the present invention. In one embodiment, the progestin or synthetic progestogen is selected from the group consisting of medroxyprogesterone acetate, hydroxyprogesterone caproate, northindrone, northindrone acetate, ethynodiol diacetate, desogestrel, norgestrel, levonorgestrel, norgestimate, gestodene, and drospirenone.

In another aspect of the present invention, the microspheres and/or formulations comprising the microspheres comprise one or more of the aforementioned progestogen drugs and one or more estrogen(s), such as ethinyl estradiol. In certain embodiments of this aspect of the invention, the progestogen drug and estrogen drug may be in the same microsphere or the progestogen drug and estrogen drug may be in separate or different microspheres. If the progestogen drug and estrogen drug are in separate/different micropsheres, the progestogen microspheres and estrogen microspheres may exhibit the same or different release profiles.

In certain aspects of the present invention, the microspheres and/or the parenteral formulations comprising the microspheres have a linear cumulative drug release profile that does not have an initial burst or a lag phase. In certain embodiments of this aspect of the present invention, the microspheres and/or the parenteral formulations comprising the microspheres have a linear cumulative drug release profile until at least about 70%, 80%, 85%, 90%, 95% or more of the progestogen is released. In certain embodiments of this aspect of the present invention, the time until at least 70%, 80%, 85%, 90%, 95% or more of the progestogen is released from the microspheres and/or parenteral formulations comprising the microspheres is about 1 day to about 30 days, preferably about 3 days to about 20 days and more preferably at least about 6, 7, 8, 9, 10, 11, 12, 13, or 14 days.

The microspheres comprise about 10 wt % to about 50 wt % based on the weight of the microspheres, preferably about 20 wt % to about 50 wt %, and more preferably about 35 wt % to about 45 wt % of the progestogen drug and preferably progesterone.

The PLGA polymers used to prepare the microspheres of the present invention are poly(lactic-co-glycolic acid) copolymers having molar ratios of lactide to glycolide between 90:10 and 40:60 preferably between about 50:50 and about 75:25. PLGA polymers may comprise a racemic mixture of the monomeric units, such as poly D, L-lactide-co-glycolide, or individual isomeric monomeric units such as poly D-lactide-co-glycolide or poly L-lactide-co-glycolide. Suitable molecular weights of the PLGA polymers desirably range from about 4,000 daltons ("4 kD") to about 120,000 daltons ("120 kD"), preferably from about 5,000 daltons ("5 kD") to about 100,000 daltons ("100 kD"), and more preferably from about 6,000 daltons ("6 kD") to about 80,000 daltons ("80 kD"). Various particularly useful ranges of PLGA molecular weights are disclosed or illustrated in various embodiments or examples provided below.

A variety of lactic acid:glycolic acid ratios are applicable in the PLGA copolymers used herein, with the ratio depending in part on the rate of degradation desired. For example, a 50:50 PLGA polymer, containing 50% lactide and 50% glycolide, would be a relatively fast degrading copolymer, while 75:25 PLGA degrades more slowly, and 85:15 and 90:10 even more slowly, due to the increased polylactide components. It is readily apparent that a suitable ratio of lactide:glycolide is easily determined by one of skill in the art. Based on these basic principles, mixtures of microspheres with varying lactide:glycolide ratios can be employed in the formulations of the invention in order to achieve the desired release kinetics.

In certain embodiments, the molecular weights of the PLGA polymers used to prepare the microspheres of the present invention may range from 4 kD and 120 kD, preferably about 5 kD to about 75 kD, and the polymer chain end groups are carboxyl-terminated or ester-terminated.

In some embodiments, the microspheres comprise a mixture of the PLGA polymers having different lactide to glycolide ratios, and/or different average molecular weights, and/or different chain-end groups. In one aspect of this embodiment, the microspheres are prepared with a mixture of PLGA polymers that comprises at least one carboxyl-terminated PLGA polymer with a molecular weight of about 5 kD to about 40 kD. In a further aspect of this embodiment, the PLGA polymer is a mixture of at least one carboxyl-terminated PLGA polymer and at least ester-terminated PLGA polymer wherein the ratio of carboxyl-terminated PLGA polymer to ester-terminated PLGA polymer ranges from about 1:1 to about 10:1, preferably about 2:1 to about 9:1 and more preferably about 3:1 to about 8:1. In a still further aspect of this embodiment, the carboxyl-terminated PLGA polymer has a molecular weight of about 5 kD to about 50 kD, preferably about 6 kD to about 45 kD and more preferably about 7 kD to about 40 kD and the ester-terminated PLGA polymer has a molecular weight of about 20 kD to about 100 kD, preferably about 30 kD to about 90 kD and more preferably about 40 kD to about 75 kD.

The progestogen-loaded microspheres have a mean diameter of between about 20 μm and about 150 μm, preferably of between about 50 μm to about 100 μm.

The progestogen-loaded microspheres particle may further exhibit a size distribution as follows:

a D10 of about 30 μm to about 55 μm, preferably about 35 μm to about 50 μm and more preferably about 40 μm to about 45 μm;

a D50 of about 50 μm to 75 μm, preferably about 55 μm to about 70 μm and more preferably about 60 μm to about 65 μm; and/or a D90 of about 75 μm to 120 μm, preferably about 80 μm to about 110 μm and more preferably about 90 μm to about 100 μm; One aspect of the present invention provides an injectable sustained-release formulation, comprising:

(a) a plurality of micropsheres comprising a progestogen compound encapsulated in a biodegradable polymer composition, preferably a biodegradable polymer composition comprising a PLGA polymer, wherein the progestogen compound can be released from the microspheres in a sustained and controlled manner with a linear or substantially linear cumulative release profile up to at least about 70%, 75%, 80%, 85%, 90%, 95% or more of accumulated release within a controlled time period of about 1 to about 30 days, preferably about 2 to about 20 days and more preferably about 5 to 15 days and substantially without an initial burst or a lag phase; and (b) a diluent solution in which the microspheres are suspended.

In one embodiment, the injectable sustained-release formulation has a linear cumulative release profile up to at least about 80% or more of accumulated release of the progestogen, preferably progesterone and substantially without any initial burst or lag phase, and the total time of the linear-stage release is about 6 to 8 days, preferably 7 days.

In another aspect, the present invention provides a method of making an injectable sustained-release formulation according to any embodiment disclosed herein, the method comprising the steps of:

1) preparing an organic dispersed phase comprising one or more biodegradable polymers, preferably one or more PLGA copolymers, an organic solvent or a mixture of organic solvents, and a progestogen compound;
2) mixing the organic dispersed phase with an aqueous continuous phase comprising water and an emulsion stabilizer such as polyvinyl alcohol (PVA) to form an oil-in-water (O/W) emulsion;
3) removing the organic solvent(s) in the O/W emulsion by extraction and/or evaporation to form solid drug-loaded PLGA microspheres;
4) drying the drug-loaded microspheres; and
5) suspending the dried drug-loaded microspheres in a diluent solution, wherein the diluent solution comprises water, preferably water for injection and one or more pharmaceutically acceptable excipients including but not limited to surface active wetting agent, a viscosity enhancing agent, a tonicity agent, a pH buffering agent and combinations thereof.

The organic solvent or mixture of organic solvents used to prepare the organic dispersed phase may be any organic solvent typically used in the preparation of pharmaceutical compositions. Examples of organic solvents that may be used include dichloromethane, ethyl acetate, acetone, benzyl alcohol, methanol, ethanol, isopropyl alcohol, 1-butanol, iso-butyl alcohol, 1-pentanol, isopentyl alcohol, 1-hexanol and combinations thereof. In one embodiment of the present invention, the organic solvent is dichloromethane or a mixture of dichloromethane and one or more additional organic solvent(s).

The terms "surface active wetting agent," "surface active agent," or "wetting agent," may be used interchangeably herein and refer generally to pharmaceutically acceptable surfactants including ionic and non-ionic surfactants.

The surface active wetting agent employed in the diluent solution of the present invention may be a non-ionic surfactant, an ionic surfactant or a combination thereof. Examples of non-ionic surfactants include polyethoxylated castor oil, a polyoxyethylene alkyl ester, a polyglycolyzed glyceride, a sorbitan fatty acid ester, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylene alkylaryl ether, a polyoxyethylene styrylaryl ether, a polyoxyethylene glycol alkyl ether, a polyoxyethylene fatty acid ester, a polyoxyethylene sorbitan fatty acid ester, a polyoxyethylene glycerin fatty acid ester, a polyoxyethylene hydrogenated castor oil, a polyoxypropylene fatty acid ester, or a mixture of the foregoing. A further listing of possible non-ionic surfactants can be found on pages 1243-1249 of Martindale, *The Extra Pharmacopoeia* 29$^{th}$ ed. which is incorporated herein by reference.

In certain embodiments, the non-ionic surfactants may comprise fatty alcohol acid or amide ethoxylates, monoglyceride ethoxylates, sorbitan ester ethoxylates alkyl polyglycosides, mixtures thereof, and the like. Certain non-ionic surfactants include polyoxyethylene derivatives of polyol esters, such as Polysorbate 20 (TWEEN 20®), Polysorbate 40 (TWEEN 40®) Polysorbate 60 (TWEEN 60®), and Polysorbate 80 (TWEEN 80®).

In certain embodiments, the non-ionic surfactant may also comprise d-alpha tocopheryl polyethylene glycol 1000 succinate (TPGS), nonoxinols, poloxamers, sorbitan monolaurate, sorbitan monooleate, sorbitan monopalmitate, sorbitan monostearate, sorbitan sesquioleate, sorbitan trioleate, tyloxapol, and mixtures of the foregoing.

Any of a variety of ionic surfactants may also be incorporated into the diluent solution of the present invention. Suitable ionic surfactants include, but are not limited to, carboxylates such as soaps, acyl lactylates, acyl amides of amino acids, esters of sulfuric acid such as alkyl sulfates and ethoxylated alkyl sulfates, sulfonates such as alkyl benzene sulfonates, acyl isethionates, acyl taurates and sulfosuccinates, phosphates, quaternary ammonium salts, and ethoxylated amines. Certain embodiments of the present invention will employ an anionic surfactant such as aluminum monostearate, calcium stearate, sulfated castor oil, sodium cetostearyl sulfate, sodium lauryl sulfate, sodium oleate, potassium oleate, zinc oleate, sodium stearate, sodium tetradecyl sulfate and mixtures therefore.

In certain embodiments the surface active wetting agent in the diluent solution of the present invention is selected from the group consisting of polysorbate (including but not limited to polysorbate 20, polysorbate 40, polysorbate 60, polysorbate 80 and mixtures thereof), phospholipids (including but not limited to dioleoylphosphatidylcholine (DOPC), dimyristoylphosphatidyl choline (DMPC), dilauroylphosphatidyl choline (DLPC), soy phosphatidylcholine (SPC), lecithin and combinations thereof), poloxamers (including but not limited to poloxamer 124, poloxamer 188, polomaxer 237, poloxamer 338, poloxamer 407 and combinations thereof) sorbitan fatty acid esters (including but not limited to sorbitan oleates, sorbitan laurates, sorbitan palmitates, sorbitan stearates and combinations thereof) and combinations thereof.

The surface active wetting agent may be present in the diluent solution of the present invention in an amount from about 0.01 wt % to about 5 wt % based upon the total weight of the diluent solution, preferably from about 0.05 wt % to about 2 wt %, and most preferably from about 0.75 wt % to about 1 wt %.

The "viscosity enhancing agent" employed in the diluent solutions of the present invention is a material that can be added to the diluent solution to increase the viscosity of the resulting diluent solution. Viscosity enhancing agents can be selected to have good hydrogen bonding capability, such as a bonding capability greater than or equal to one per molecule.

Suitable viscosity enhancing agents include biodegradable and non-biodegradable polymer materials.

Viscosity enhancing agents that may be used in the diluent solutions of the present invention include organic materials such as natural or synthetic waxes, $C_{12}$-$C_{60}$ alcohols, $C_{12}$-$C_{60}$ acids, alpha-hydroxy fatty acids, polyhydroxy fatty acid esters, polyhydroxy fatty acid amides, and inorganic/organic materials such as metal ester complexes containing zinc, calcium, aluminum or magnesium, fumed silicas, and organoclays. Additional viscosity enhancing agents include polyol polyesters, glyceryl esters, polyglyceryl esters, and polysiloxanes.

Waxes are also suitable for use as viscosity enhancing agents in compositions of the present invention. Natural waxes may include, but are not limited to, carnauba, ozokerite, beeswax, candelilla, paraffin, ceresin, esparto, ouricuri, rezowax and other known mined and mineral waxes. Synthetic waxes may include, but are not limited to, paraffin waxes and microcrystalline waxes.

Still further viscosity enhancing agents that may be included in the compositions of the present invention are gelling agents. Gelling agents are materials that can swell or expand when in contact with water. Examples of gelling agents that may be used in the present invention include swellable polymers, also known as osmopolymers or hydrogels. The swellable polymer can be non-cross-linked or lightly cross-linked. The cross-links can be covalent or ionic bonds with the polymer possessing the ability to swell in the presence of fluid, and when cross-linked, it will not be dissolved in the fluid. The polymer can be of plant, animal, or synthetic origin.

Polymeric gelling agents useful for the present purpose include polyhydroxyalkylcellulose having a molecular weight greater than 50,000, such as hydroxyl propylmethylcellulose (METHOCEL K 100M available from Dow Chemical); poly(hydroxyalkylmethacrylate) having a molecular weight of from 5,000 to 5,000,000; poly(vinylpyrrolidone) having a molecular weight of from 100,000 to 3,000,000; anionic and cationic hydrogels; poly(electrolyte) complexes; poly(vinylalcohol) having a low acetate residual; a swellable mixture of agar and carboxymethyl cellulose; a swellable composition comprising methyl cellulose mixed with a sparingly cross-linked agar; a polyether having a molecular weight of from 10,000 to 6,000,000; a water-swellable copolymer produced by a dispersion of a finely divided copolymer of maleic anhydride with styrene, ethylene, propylene, or isobutylene; a water-swellable polymer of N-vinyl lactams, and the like.

Other gelling agents useful in the present invention include pectin having a molecular weight ranging from 30,000 to 300,000; polysaccharides such as agar, acacia, karaya, tragacanth, algins and guar; CARBOPOL® an acrylic acid polymer, a carboxyvinyl polymer, sometimes referred to as carboxypolymethylene, a polymer of acrylic acid cross-linked with a polyallyl ether of sucrose, as described in U.S. Pat. Nos. 2,798,053 and 2,909,462 and available as CARBOPOL® 934, 940 and 941, and its salt derivatives; polyacrylamides; water-swellable indene maleic anhydride polymers; GOOD-RITE® polyacrylic acid having a molecular weight of 80,000 to 200,000; POLYOX™ polyethylene oxide polymers having a molecular weight of 100,000 to 7,000,000; starch graft copolymers; AQUA-KEEP™ acrylate polymers with water absorbability of about 400 times its original weight; diesters of polyglucan; a mixture of cross-linked polyvinyl alcohol and poly(N-vinyl-2-pyrrolidone); poly(ethylene glycol) having a molecular weight of 4,000 to 100,000. Representative polymers possessing gelling properties are described in U.S. Pat. Nos. 6,419,954, 4,915,949, 4,327,725, 4,207,893 and in Handbook of Common Polymers, by Scott and Roff, published by Cleveland Rubber Company, Cleveland, Ohio.

Non-limiting examples of preferred viscosity enhancing agents include one or more biodegradable polymers and oligomers include: poly(lactide), poly(lactide-co-glycolide), poly(glycolide), poly(caprolactone), polyamides, polyanhydrides, polyamino acids, polyorthoesters, polycyanoacrylates, poly(phosphazines), poly(phosphoesters), polyesteramides, polydioxanones, polyacetals, polyketals, polycarbonates, polyorthocarbonates, degradable polyurethanes, polyhydroxybutyrates, polyhydroxyvalerates, polyalkylene oxalates, polyalkylene succinates, poly(malic acid), chitin, chitosan, and copolymers, terpolymers, oxidized cellulose, hydroxyethyl cellulose, or combinations or mixtures of the above materials. The viscosity enhancing agent is preferably selected from the groups consisting of carboxymethylcellulose salts, gums such as acacia, gelatin, celluloses such as methylcellulose, hydroxypropyl cellulose, hydroxypropyl methylcellulose, polyvinyl pyrrolidone and combinations thereof. In some specific embodiments, the viscosity enhancing agents include carboxymethylcellose salts such as sodium carboxymethylcellulose.

The viscosity enhancing agent can be present in diluent solution in an amount ranging from about 0.01 wt % to about 10 wt % percent based on the total weight of the diluent solution without the microspheres, preferably about 0.5 wt % to about 7.5 wt % and more preferably about 1 wt % to about and from about 1 to about 5 wt %.

The term "tonicity agent" used herein refers to one or more excipients that can be added to the diluent solution to adjust the tonicity of the injectable sustained-release formulation to correspond to that of body fluids such a blood, thus resulting in reduced levels of irritability. In some embodiments, the tonicity agent is present in the diluent solution to impart an osmolality to the injectable sustained-release formulation comprising the microspheres from about 250 mOsm/L to about 400 mOsm/L. Examples of tonicity agents include, but are not limited to, mannitol, sorbitol, glycerol, sucrose, glucose, dextrose, levulose, fructose, lactose, polyethylene glycols 400 to 4000, phosphates, sodium chloride, potassium chloride, calcium chloride, calcium gluconogluco heptonate, dimethyl sulfone or mixtures thereof.

A tonicity agent, if present in the diluent solution, may comprise about 0.1 wt % to about 10 wt %, preferably about 1.0 wt % to about 8.0 wt % and more preferably 3.0 wt % to 6.0 wt %, based on the total weight of the diluent solution. The amount of the tonicity agent will vary depending upon the components present in the final injectable sustained-release formulation. The tonicity agent should be present in the diluent solution in amount so the final osmolality to the injectable sustained-release formulation comprising the microspheres is from about 250 mOsm/L to about 325 mOsm/L and preferably to make the injectable sustained-release formulation isotonic.

Examples of buffers or buffering agents that may be used in the diluent solution of the present invention include, but are not limited to, acetic acid, adipic acid, ammonium carbonate, ammonium phosphate, boric acid, citric acid, lactic acid, phosphoric acid, potassium citrate, potassium phosphate, sodium acetate, sodium citrate, sodium carbonate, potassium carbonate, sodium bicarbonate, potassium bicarbonate, sodium lactate, sodium phosphate, succinic acid, and combinations thereof. Typically the buffer will comprise a combination of the foregoing as to create a buffer system such as citric acid and sodium citrate or acetic acid and sodium acetate.

Examples of pH adjusting agents that may be used in the present invention include, but are not limited to, any of the pharmaceutically acceptable acids or bases used to adjust the pH of pharmaceutical compositions. Examples of compounds typically used to adjust the pH of pharmaceutical compositions include hydrochloric acid, citric acid, lactic acid, tartaric acid, glacial acetic acid, sodium hydroxide, potassium hydroxide, arginine, lysine, meglumine, triethanol amine, or combinations thereof.

If employed, the buffer/pH adjusting agent may be present in an amount sufficient to produce and maintain during storage a pH of the injectable sustained-release formulation of about 5.0-8.0, preferably about 5.5-7.5 and most preferably about 6.0-7.0. The injectable sustained-release formulation should maintain the pH for at least six months, 9 months, 12 months, 18 months, or 24 months under normal storage conditions, 25° C. and 60% relative humidity.

In one embodiment of the present invention, the diluent solution comprises a surface-active wetting agent, a viscosity enhancing agent, a tonicity agent, a pH buffering agent, and water for injection.

In one embodiment of the present invention, the diluent solution comprises polysorbate, carboxymethyl cellulose sodium, sodium chloride, citric acid, and di-sodium hydrogen phosphate.

The present invention also provides a method of preventing pregnancy and treating gynecological disorders or providing treatment to support pregnancy and fertility in women, comprising injecting a subject in need of such treatment a therapeutically effective amount of the injectable sustained-release formulation disclosed herein or prepared by a method according to any embodiment disclosed herein. Preferably the method will comprise the subcutaneous or intramuscular administration of the injectable sustained-release formulation with the suspended microspheres once every 6, 7, 8, 9, 10, 11, 12, 13 or 14 days and each administration will comprise about 50 mg to about 500 mg of progestogen, preferably about 75 mg to about 400 mg of progestogen and more preferably about 100 mg to about 300 mg of progestogen.

In one embodiment, the gynecological disorder is selected from the group consisting of secondary amenorrhea, endometriosis, abnormal uterine bleeding due to hormonal imbalance, and acne.

In another aspect of the invention, the present invention provides a combination of a device or kit containing the microspheres described herein or formulations containing the microspheres such as the injectable sustained-release formulations disclosed herein for convenience of administration, for example, a syringe containing a single dose of microspheres containing an active progestogen compound for treating a condition that is treatable by the sustained release form of microspheres. Such a syringe can optionally be attached to a needle ready for injection. Such a needle should have a bore size that is appropriate for introduction of the microspheres, and may be optionally capped with a needle cover. All such device or kit should be in sterile conditions and preferably stored and readily transportable under such conditions.

The microspheres of the present invention can be prepared and formulated to have qualities suitable to be delivered by other parenteral and non-parenteral routes such as oral, buccal, intrathecal, nasal, pulmonary, transdermal, transmucosal and the like.

In other aspects, the microspheres of the present invention can be administered alone, or in appropriate combination with other active agents or drug therapies, as part of a pharmaceutical formulation. Such a pharmaceutical formulation may include the microspheres in combination with any standard physiologically and/or pharmaceutically acceptable carriers that are known in the art. The formulation compositions preferably are sterile and contain a therapeutically effective amount of the microsphere in a unit of weight or volume suitable for administration to a patient.

The progestogen microspheres of the present invention may be made by any method commonly employed in the pharmaceutical arts, and are preferably made using an oil-in-water emulsification step followed by solvent extraction and evaporation process. The suspension of microspheres is subsequently sieved, de-watered, washed by water, and dried using air drying or vacuum drying. More detailed information for preparing the microspheres of the present invention are provided in the Examples below.

Some embodiments of the microspheres of the present invention may be prepared to exhibit the following in vitro release profile when approximately 20-25 mg of the microspheres are placed in 200 mL of a release medium comprising a Phosphate-Buffered Saline ("PBS") solution with 0.5% of sodium dodecyl sulfate ("SDS") and 0.02% sodium azide, and a pH of about 7.40. The test suspension is placed in a an appropriately sized container such as a 475 mL glass jar (closed with cap) and the closed container is placed in a 37° C. water bath shaking at a speed of 90 RPM:

| Day | % Released | % Released |
|---|---|---|
| 1 | 0-30 | 5-25 |
| 2 | 5-40 | 10-35 |
| 3 | 10-50 | 15-45 |
| 4 | 15-70 | 20-65 |
| 5 | 20-80 | 25-75 |
| 6 | 30-90 | 35-85 |
| 7 | 40-100 | 45-95 |
| 8 | 50-100 | 55-100 |

EXAMPLES

Example 1

Six progesterone microsphere formulations were prepared using progesterone (4-Pregnene-3,20-dione), micronized powder, USP, Spectrum Chemical MFG Corp and one or more of the PLGA polymers with different lactide/glycolide ratio, molecular weight, and chain-end groups as listed in Table 1.

TABLE 1

Lists the PLGA polymers used in preparing Formulations 1-6.

| PLGA | L/G Ratio | Mw | End Group | Source |
|---|---|---|---|---|
| Resomer ® RG 502 | 50:50 | 7-17 kD | Ester | Sigma Aldrich |
| Resomer ® RG 502H | 50:50 | 7-17 kD | Carboxyl | Sigma Aldrich |
| Resomer ® RG 503H | 50:50 | 24-38 kD | Carboxyl | Sigma Aldrich |
| Resomer ® RG 505 | 50:50 | 54-69 kD | Ester | Evonik |
| Resomer ® RG 752H | 75:25 | 4-15 kD | Carboxyl | Sigma Aldrich |

The formulations were prepared by emulsification and solvent extraction/evaporation method. First, an organic phase solution was prepared by mixing 300 mg of one or a mixture of the PLGA listed in Table 1, 300 mg of Progesterone, and 2.0 mL of dichloromethane. The mixture was stirred at room temperature to form a clear solution. Subsequently, the organic phase solution was injected into 30 mL of a water solution of 1% PVA (Polyvinyl alcohol 8-88, EMPROVE® Ph Eur, USP, JPE) and the solution is immediately emulsified with a Polytron PT-3100 homogenizer running at a mixing speed of about 600 rpm. After a total mixing time of about 1.5 minute, the emulsion was immediately transferred into 300 mL of water in a larger container. The emulsion was stirred at medium speed for about 4 hours to remove the solvent. The final suspension of solidified microspheres was sieved through a 150-μm screen to separate any large agglomerates, and the product was de-watered and collected on a 25-μm screen. The microspheres were further washed with deionized water and dried in 2-8° C. air for overnight, followed by drying in vacuum (below 0.5 Torr) for 6 hours.

Table 2 provides the detailed information of Formulations 1-6, including the compositions of the raw materials and the measured drug loading and encapsulation efficiency results.

TABLE 2

Detailed Information of Formulations 1-6

| Formulation # | Organic Phase Composition | Drug Loading (%) | Encapsulation Efficiency (%) |
|---|---|---|---|
| 1 | RG 502H: 300 mg<br>Progesterone: 300 mg<br>Dichloromethane: 2.0 mL | 43.8 | 87.6 |
| 2 | RG 502H: 240 mg<br>RG 505: 60 mg<br>Progesterone: 300 mg<br>Dichloromethane: 2.0 mL | 40.8 | 81.6 |
| 3 | RG 502H: 262.5 mg<br>RG 505: 37.5 mg<br>Progesterone: 300 mg<br>Dichloromethane: 2.0 mL | 41.5 | 83.0 |
| 4 | RG 503H: 300 mg<br>Progesterone: 300 mg<br>Dichloromethane: 2.0 mL | 40.0 | 80.0 |
| 5 | RG 502: 300 mg<br>Progesterone: 300 mg<br>Dichloromethane: 2.0 mL | 42.5 | 85.0 |
| 6 | RG 752H: 300 mg<br>Progesterone: 300 mg<br>Dichloromethane: 2.0 mL | 41.0 | 82.1 |

The following HPLC method was used to determining the Drug Loading (%) and Encapsulation Efficiency (%) reported in Table 2:

Chromatographic Parameters:
Column: Phenomenex Luna C18(2), 5 µm, 4.6 mm×250 mm
Column Temperature: 35° C.
Mobile Phase: 65:35 (v/v) Acetonitrile/[water/methanol 2:1 (v/v)], isocratic
Flow Rate: 1.0 mL/min
Injection Volume: 20 µL
Detection: UV absorption at wavelength of 242 nm Preparation of the standard solution is achieved by accurately weighing approximately 20 mg of progesterone reference standard into a 100-mL volumetric flask, adding approximately 80 mL of methanol, mixing and sonicating to dissolve, and making up to volume with methanol. The stock standard solution is further diluted 1/10 with methanol to make a working standard of approximately 20 µg/mL of progesterone.

Preparation of sample solution is achieved by accurately weighing approximately 20 mg of the progesterone-loaded PLGA microspheres into a 50-mL volumetric flask, adding approximately 20 mL of acetonitrile, mixing and sonicating to dissolve the microspheres, and using 1:1 (v/v) methanol/water to make up to volume. The sample solution is further diluted 1/10 with 1:1 (v/v) methanol/water, and the solution is filtered through 0.45 µm PVDF syringe filter before the HPLC injection. The percent of drug loading is calculated by:

Drug Loading (%)=Weight of Progesterone in Microsphere Sample/Total Weight of Microspheres The encapsulation efficiency is calculated by:

Encapsulation Efficiency (%)=Actual Percent of Drug Loading/Theoretical Percent of Drug Loading (percent of progesterone in total solid weight of raw materials)

The following in vitro Release Testing of progesterone-loaded microspheres was conducted on Formulations 1-6 reported in Table 2:

In vitro release testing of the progesterone-loaded microspheres Formulations 1-6 described in Table 2 was conducted by suspending approximately 15 mg of the microsphere sample in 200 mL of release medium. The release medium comprised a Phosphate-Buffered Saline ("PBS") solution to which was added 0.5% of sodium dodecyl sulfate ("SDS") and 0.02% sodium azide, and the pH was adjusted at 7.40. The sample suspension is contained in a 475 mL glass jar (closed with cap) which was placed in a 37° C. water bath shaking at a speed of 90 RPM. At each predetermined sampling time point the microspheres were allowed to settle and then 2 mL of the medium is taken from the top and another 2 mL of fresh medium is added back. The sample solution was filtered through a 0.45 µm PVDF syringe filter before the HPLC injection.

The chromatographic parameters used are the same described above.

Cumulative percentage of drug release was calculated based on the drug concentration in the medium, the adjusted medium volume, the total weight of the microspheres and the percent of drug loading in the microspheres.

A representative in vitro release profile for Formulation 1 is shown in FIG. 1 for a microsphere formulation prepared using a PLGA polymer having a lactide/glycolide (L/G) ratio of 50:50, a molecular weight in the range of 7 kD to 17 kD, and the polymer chains carboxyl-terminated. The drug loading of the formulation is about 43.8% and the encapsulation efficiency is about 87.6%. The cumulative drug release curve is substantially linear in the early days of in vitro release, and the time for up to 80% of release is controlled within 8 to 9 days. However, the release slows down at later stage of release.

Figure 2:
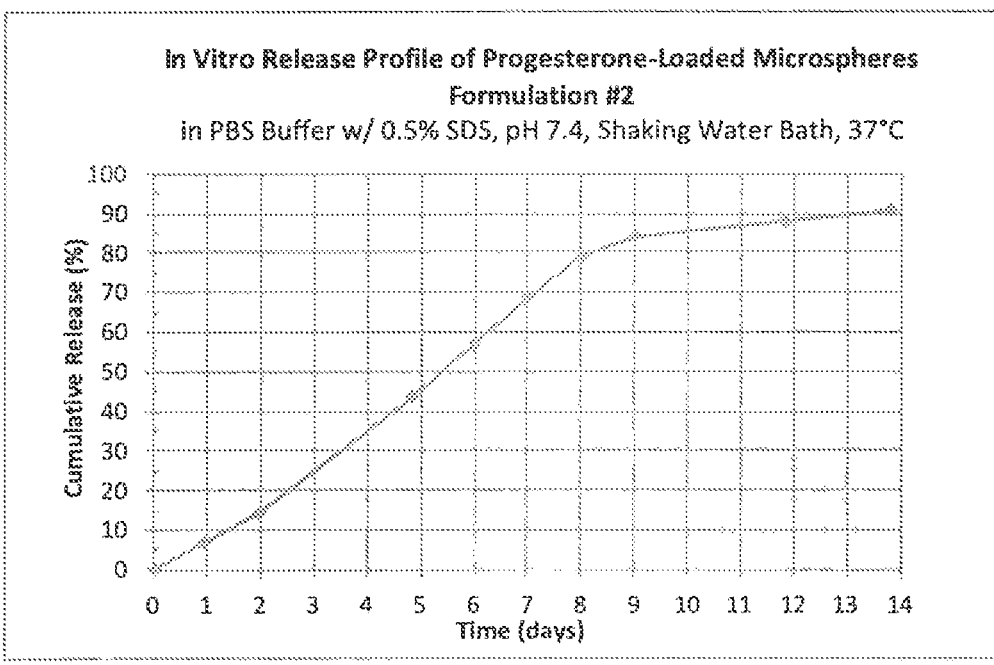
FIG. 2 shows the in vitro release profile of progesterone Formulation-2 described in Example 1.

A representative in vitro release profile for Formulation 2 is shown in FIG. 2 for a microsphere formulation prepared using a mixture of two PLGA polymers: 1) a PLGA having a L/G ratio of 50:50, a molecular weight in the range of 7 kD to 17 kD, and the polymer chains carboxyl-terminated (polymer 1), and 2) a PLGA having a L/G ratio of 50:50, a molecular weight in the range of 54 kD to 69 kD, and the polymer chains ester-terminated (polymer 2). The ratio of the polymer 1 to polymer 2 is 4:1 (w/w). The drug loading of the formulation is about 40.8% and the encapsulation efficiency is about 81.6%. The cumulative drug release curve is substantially linear from the beginning up to 80% of cumulative release, and the time is controlled within 8 days.

Figure 3:
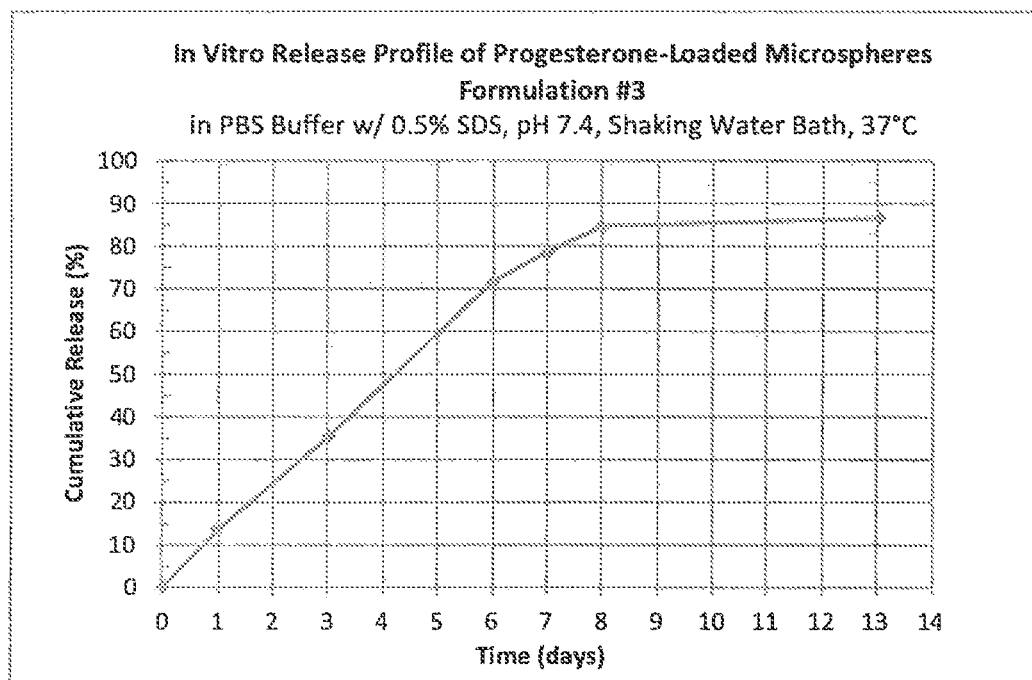
FIG. 3 shows the in vitro release profile of progesterone Formulation-3 described in Example 1.

A representative in vitro release profile for Formulation 3 is shown in FIG. 3 for a microsphere formulation prepared using a mixture of two PLGA polymers: 1) a PLGA having a L/G ratio of 50:50, a molecular weight in the range of 7 kD to 17 kD, and the polymer chains carboxyl-terminated (polymer 1), and 2) a PLGA having a L/G ratio of 50:50, a molecular weight in the range of 54 kD to 69 kD, and the polymer chains ester-terminated (polymer 2). The ratio of the polymer 1 to polymer 2 is 7:1 (w/w). The drug loading of the formulation is about 41.5% and the encapsulation efficiency is about 83.0%. The cumulative drug release curve is substantially linear from the beginning up to 80% of cumulative release, and the time is controlled within 7 days.

Figure 4:
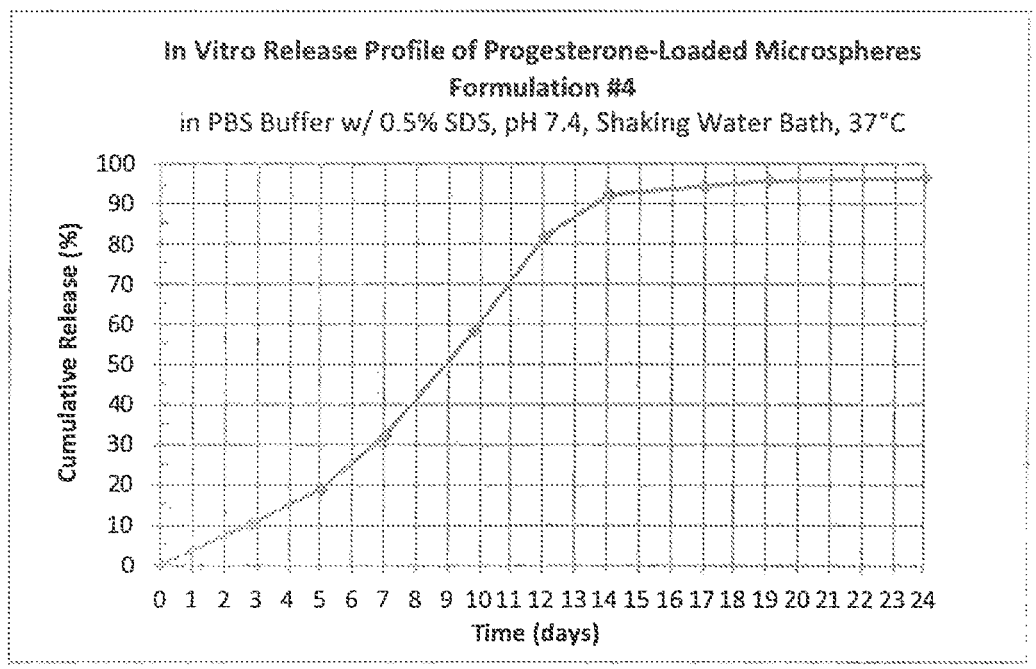
FIG. 4 shows the in vitro release profile of progesterone Formulation-4 described in Example 1.

A representative in vitro release profile for Formulation 4 is shown in FIG. 4 for a microsphere formulation prepared using a PLGA polymer having a L/G ratio of 50:50, a molecular weight in the range of 24 kD to 38 kD, and the polymer chains carboxyl-terminated. The drug loading of the formulation is about 40.0% and the encapsulation efficiency is about 80.0%. The cumulative drug release curve is slightly concavely curved from the beginning up to 80% of cumulative release, and the time is controlled in 12 to 14 days.

Figure 5:
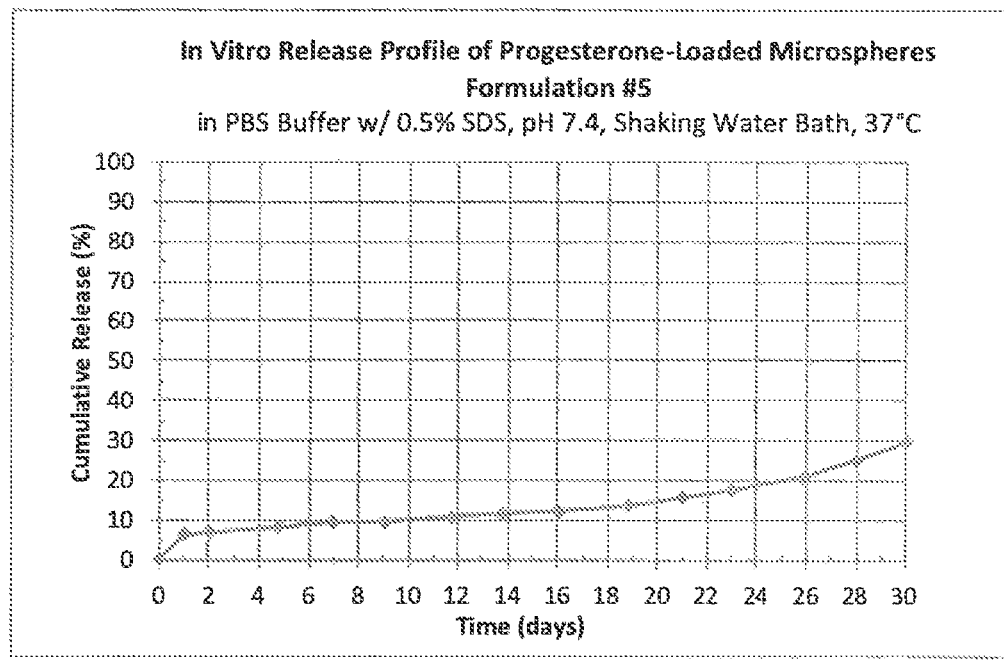
FIG. 5 shows the in vitro release profile of progesterone Formulation-5 described in Example 1.

A representative in vitro release profile for Formulation 5 is shown in FIG. 5 for a microsphere formulation prepared using a PLGA polymer having a L/G ratio of 50:50, a molecular weight in the range of 7 kD to 17 kD, and the polymer chains ester-terminated. The drug loading of the formulation is about 42.5% and the encapsulation efficiency is about 85.0%. The cumulative drug release is only approximately 10% in 10 days, and only approximately 30% in 30 days.

Figure 6:
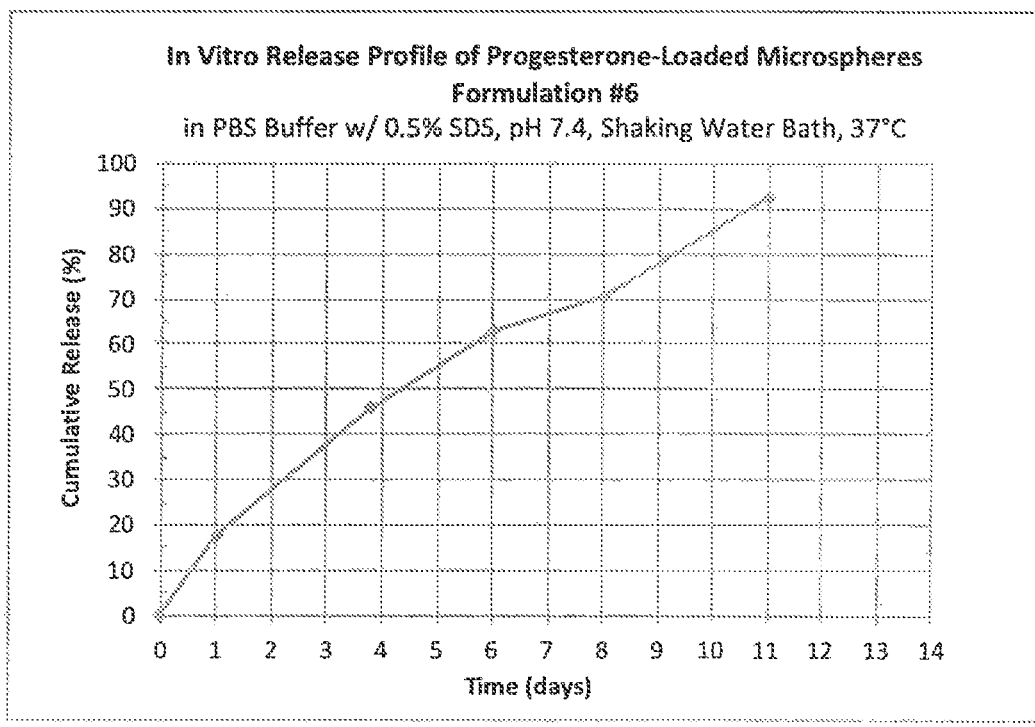
FIG. 6 shows the in vitro release profile of progesterone Formulation-6 described in Example 2.

A representative in vitro release profile for Formulation 6 is shown in FIG. 6 for a microsphere formulation prepared using a PLGA polymer having a L/G ratio of 75:25, a molecular weight in the range of 4 kD to 15 kD, and the polymer chains carboxyl-terminated. The drug loading of the formulation is about 41.0% and the encapsulation efficiency is about 82.1%. The cumulative drug release is close to linear up to 80% of the release, and the time is controlled in approximately 11 days.

Figure 7:
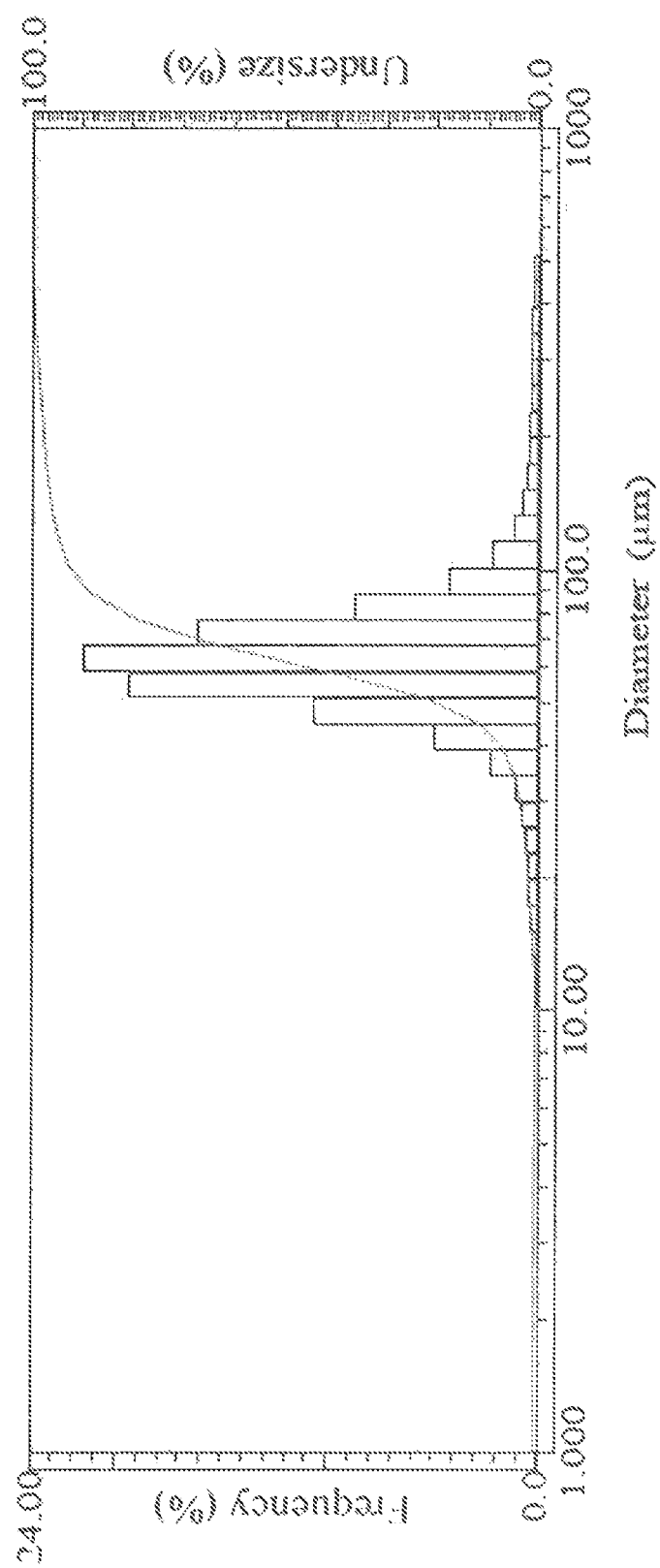
FIG. 7 shows the particle size distribution of the microspheres of progesterone Formulation-2 described in Example 1.

The average particle size and size distribution of the microsphere can be measured with HORIBA LA-920 laser diffraction particle size analyzer. FIG. 7 shows the representative particle size distribution of the microspheres of the present invention, particularly of Formulation 2, which has D10, D50, and D90 values of 42 μm, 62 μm, and 94 μm, respectively.

Example 2

Injectable sustained-release formulations can be prepared by suspending the microspheres of Example 1, Formulations 1-6 in either of the following dilution solutions Diluent Solution 1:

| Ingredient | Concentration |
|---|---|
| Sodium carboxymethyl cellulose | 2.0% by weight |
| Polysorbate 20 | 0.1% by weight |
| Sodium chloride | 0.58% by weight |
| Disodium hydrogen phosphate dihydrate, 5-10 mM | 98.9% |
| pH | 6-7 |

Diluent Solution 2:

| Ingredient | Concentration |
|---|---|
| Sodium carboxymethyl cellulose | 2.0% by weight |
| Polysorbate 20 | 0.1% by weight |
| Citric acid anhydrous | 0.1% by weight |
| Sodium chloride | 0.56% by weight |
| Disodium hydrogen phosphate dihydrate, 5-10 mM | 98.9% |
| pH | 6-7 |

The final injectable sustained-release formulation with the suspended microspheres will comprise about 50 mg-500 mg of progesterone per mL, preferably about 75 mg-400 mg of progesterone per mL and more preferably about 100 mg to about 300 mg of progesterone per mL. The final injectable formulations may be packaged in the single dose vial or syringe or a multiple dose vial.

All methods described herein can be performed in any suitable order unless expressly indicated otherwise or otherwise clearly in conflict with context.

The invention described herein may be practiced in the absence of any element or elements, limitation or limitations which is not specifically disclosed herein. Thus, for example, in each instance herein, any of the terms "comprising," "consisting essentially of," and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the claims.

The invention claimed is:

1. An injectable sustained-release formulation, comprising:
    (a) microspheres comprising progesterone and a biodegradable composition comprising one or more poly (lactic-co-glycolic acid) copolymers (PLGA), and
    (b) a diluent solution in which the microspheres are suspended wherein the one or more PLGA copolymers is a PLGA copolymer with a molar ratio of lactide to glycolide of about 50:50, about 75:25 or is a combination of PLGA copolymers with a molar ratio of lactide to glycolide of about 50:50 and 75:25 and a molecular weight in the range between 4 kD and 75 kD;
    wherein the progesterone is present in an amount of between about 35% and about 50% by weight of the microspheres; and
    the microspheres encapsulating the progesterone have a mean diameter of between about 50 μm and about 100 μm; and
    wherein an in vitro release profile graph of the microspheres exhibits a linear correlation coefficient equal to or greater than 0.75 from a 0,0 time point to a 70% progesterone release point on the graph when the in vitro release profile is determined by placing approximately 20-25 mg of the microspheres in a container comprising about 200 mL of a release medium comprising a phosphate-buffered saline solution with 0.5% of sodium dodecyl sulfate, 0.02% sodium azide, and a pH of about 7.40 and placing the container with the microspheres and release medium in a 37° C. water bath shaking at a speed of about 90 RPM.

2. The formulation of claim 1, wherein the progesterone is combined with an estrogen.

3. The formulation of claim 1, wherein the one or more PLGA copolymers are carboxyl-terminated or ester-terminated.

4. The formulation of claim 1, wherein the microspheres comprise a PLGA copolymer with a molar ratio of lactide to glycolide of about 50:50 and a PLGA copolymer with a molar ratio of lactide to glycolide of about 75:25.

5. The formulation of claim 4, wherein at least one of the PLGA copolymers comprises at least one carboxyl-terminated PLGA polymer with a molecular weight of about 5 kD to about 40 kD.

6. The formulation of claim 1 wherein the progesterone comprises between about 35% and about 45% by weight of the microspheres.

7. The formulation of claim 1, wherein the in vitro release profile graph exhibits a linear correlation coefficient equal to or greater than 0.80 from a 0,0 time point to an 80% progesterone release point on the graph and the 80% progesterone release point occurs after about 6 to 8 days of in vitro testing.

8. A method of making an injectable sustained-release formulation according to claim 1, comprising:
1) Preparing an organic dispersed phase comprising the one or more PLGA copolymers, an organic solvent or a mixture of organic solvents, and the progesterone; 2) mixing the organic dispersed phase with an aqueous continuous phase comprising water and polyvinyl alcohol (PVA) to form an oil-in-water (O/W) emulsion; 3) removing the organic solvent(s) in the O/W emulsion by extraction and/or evaporation to form solid drug-loaded PLGA microspheres; 4) drying the drug-loaded microspheres; and 5) suspending the dried drug-loaded microspheres in a diluent solution, wherein the diluent solution comprises a surface active wetting agent, a viscosity enhancing agent, a tonicity agent, a pH buffering agent, and water for injection.

9. The method of claim 8, wherein the organic solvent is dichloromethane or a mixture of dichloromethane and other organic solvent(s).

10. The method of claim 8, wherein the in vitro release profile graph exhibits a linear correlation coefficient equal to or greater than 0.80 from a 0,0 time point to an 80% progesterone release point on the graph and the 80% progesterone release point occurs after about 6 to 8 days of in vitro testing.

11. The method of claim 8, wherein the diluent solution comprises polysorbate 20, carboxymethyl cellulose sodium, sodium chloride, citric acid, and di-sodium hydrogen phosphate.

12. A method of preventing pregnancy and treating gynecological disorders or providing treatment to support pregnancy and fertility in women, comprising locally injecting to a subject in need thereof a therapeutically effective amount of the injectable sustained-release formulation of claim 1.

13. The method of claim 12, wherein the gynecological disorder is selected from the group consisting of secondary amenorrhea, endometriosis, abnormal uterine bleeding due to hormonal imbalance, and acne.

* * * * *